United States Patent Office 3,146,265
Patented Aug. 25, 1964

3,146,265
6-DEOXY-6-HYDROPEROXY DEHYDROTETRA-
CYCLINES AND PROCESS UTILIZING THE
SAME
Alastair I. Scott, Beith, Ayrshire, and Colin T. Bedford,
Glasgow, Scotland, assignors to The University Court
of the University of Glasgow, Glasgow, Scotland
No Drawing. Filed June 4, 1962, Ser. No. 199,590
Claims priority, application Great Britain Apr. 16, 1962
15 Claims. (Cl. 260—559)

This invention relates to a new and useful chemical process and to the novel intermediates employed therein. More specifically, it relates to the conversion of anhydrotetracyclines to dehydrotetracyclines, and to certain hydroperoxy dehydrotetracyclines which are employed in the new process.

In the past, it has been proposed that the conversion of anhydrotetracyclines to dehydrotetracyclines be conducted microbiologically. While this discovery represented a substantial advance in the art, such fermentation processes entail combination of the anhydrotetracyclines with a variety of nutrients and mineral substances, with attendant complications in product recovery.

Now it has been found that anhydrotetracyclines may be converted by photo-oxidation to 6-deoxy-6-hydroperoxy dehydrotetracyclines, and that these new intermediates may in turn be reduced to dehydrotetracyclines.

The oxidation step of the process of this invention is preferably effected by dissolving or dispersing the anhydrotetracycline in a reaction-inert solvent, i.e. one which is substantially inert to the effects of oxygen and light under the reaction conditions, and introducing molecular oxygen (in the form of air, if desired) into the solution or dispersion while irradiating with light. A minimum of laboratory experimentation will permit the selection of appropriate solvents for the present process. Those suitable include aromatic solvents, alcohols and the like. The concentration of the anhydrotetracycline in the solvent is not critical.

The light is advantageously of a wavelength not less than 300 m$\mu$ and is preferably of wavelength from about 300 to 450 m$\mu$. In order to conveniently achieve this, the reaction may be carried out in a vessel constructed of a material such as Pyrex glass, which filters out substantially all the light passing through the vessel having a wavelength below 300 m$\mu$.

The temperature at which the oxidation is carried out is not particularly critical for good yields of products, but is conveniently within the range from 20° to 40° C.; for instance, from 25° to 30° C.

The time required for substantial conversion of the anhydrotetracycline to the corresponding hydroperoxide will naturally vary widely with reaction conditions, including the light intensity, the temperature, and the oxygen flow rate, and is therefore best determined by trial in the individual case.

The nature of the new process is such that it is widely applicable to the conversion of the anhydrotetracyclines as a class to the corresponding hydroperoxides and thence to the corresponding dehydrotetracyclines. Anhydrotetracyclines each contain a double bond at the 5a,6-position. A great variety are already described in the literature, including anhydrotetracycline, anhydrochlortetracycline, anhydrobromtetracycline, anhydrooxytetracycline, and their various derivatives, including the 4-epi-, the 4-desidimethylamino-, the 6-demethyl-, and the 12-a-deoxy-derivatives. In addition, syntheses of a variety of anhydrotetracyclines are shown in the literature, e.g., in the Journal of The American Chemical Society, volume 81, p. 1006 ff. (1959), and volume 83, p. 439 ff. (1961); as well as in Chem. Berichte, volume 92, p. 3122 ff. (1959), and U.S.

Patent 3,002,993. The preparation of anhydrotetracyclines containing alkyl substituents in the D-ring, and their N-alkyl carboxamido derivatives, is described in U.S. Patent 2,895,993 and 3,028,409. Further, anhydrodiacetyloxytetracycline and 12a-deoxy-12a-methyl-anhydrooxytetracycline are described in Canadian Patent 534,669; and bromanhydro-12a-bromo-12a-deoxy desdimethylaminotetracycline as described in U.S. Patent 3,013,075.

Among the valuable new 6-deoxy-6-hydroperoxy-dehydrotetracycline intermediates produced by the new process are those of the formula

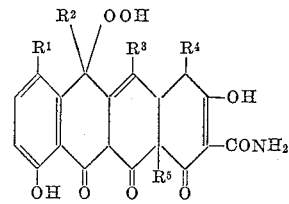

wherein $R^1$ is selected from the group consisting of hydrogen, chloro and bromo; $R^2$ is selected from the group consisting of hydrogen and methyl; $R^3$ is selected from the group consisting of hydrogen and hydroxy, where that $R^1$ is hydrogen when $R^3$ is hydroxy and dimethylamino, and the group consisting of hydrogen and dimethylamino; and $R^5$ is selected from the group consisting of hydrogen and hydroxy.

Thus, for example, application of the present procedure to anhydrotetracycline provides 6-deoxy-6-hydroperoxy-5,5a-dehydrotetracycline; whereas anhydrochlortetracycline and anhydrooxytetracycline provide the respective 7-chloro and 5-hydroxy derivatives.

To complete the transformation of the anhydrotetracycline, the novel photo-oxidation step of this invention is followed by reduction of the hydroperoxide to the corresponding dehydrotetracycline. This reduction step may be conducted in any of a variety of ways. Thus, for example, the hydroperoxide may be reduced by hydrogenation in the presence of a noble metal catalyst. Such catalysts include the platinum group metal catalysts, particularly palladium, supported palladium such as palladium-charcoal catalysts, rhodium, and the like. Catalytic hydrogenation is conveniently conducted in a reaction-inert solvent for the hydroperoxide, i.e. a solvent which does not react in an undesired manner with the reactants or product. A variety of organic solvents may be used for this purpose, and routine laboratory experimentation will readily permit the selection of the most suitable solvent for any specific starting compound. Generally, lower alkanols, e.g. methanol and ethanol are found to be satisfactory, although a variety of other solvents may also be used. Pressures of hydrogen gas ranging from atmospheric to superatmospheric are appropriate, but substantially atmospheric pressure will often be selected as most convenient. The noble metal catalyst employed may already contain sufficient occluded hydrogen to permit the desired reduction to take place without the use of additional hydrogen gas. The hydroperoxy-tetracycline compound, may for example, be shaken in methanol solution with hydrogen and catalyst until one molar proportion of hydrogen is absorbed: if desired, the hydrogenation may be continued until the dehydrotetracycline double bond is also saturated to provide the final tetracycline. At the conclusion of the reaction, the product is recovered by standard procedures, e.g. by filtering and evaporating the filtrate, preferably under vacuum.

In another method for conducting the reduction any one of a variety of chemical reducing agents may be employed. These include active metals in mineral acids, e.g. zinc in dilute hydrochloric acid; as well as sodium iodide in a halogen-acceptor solvent such as acetone or methanol, preferably in the presence of zinc metal. A particularly preferred chemical reduction procedure involves contacting the hydroperoxide with an aqueous solution of an alkali metal sulfite or hydrosulfite, preferably the readily available sodium sulfite or a sodium hydrosulfite. For such treatment, it is usually preferred to employ the hydroperoxide in solution in a reaction-inert solvent such as chloroform. After intimate contact between the aqueous and the organic solutions, the two phases are separated and the product recovered from the organic phase by evaporation of the solvent.

After isolation, the reaction products may be further purified by any of the general, known methods, including recrystallization from various solvents and mixed solvent systems, chromatography and solvent distribution.

The dehydrotetracyclines produced by the present process are well known substances. While they are frequently designated. Nevertheless, there is no doubt as to the cyclines:

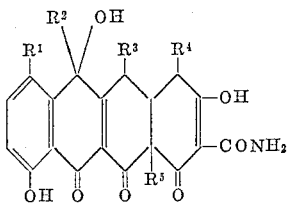

The preponderance of evidence now seems to favor the structure having the unsaturation at the 5,5a-position:

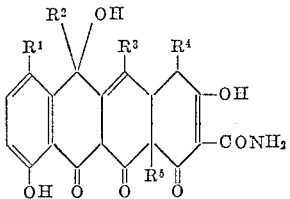

where the substituents have the significance previously designated. Nevertheless, there is no doubt as to the identity of the products produced by the present process and those which have been previously prepared by fermentation or by microbiligical oxidation of anhydrotetracyclines, and we do not wish to be bound by any particular structure.

The dehydrotetracyclines are useful intermediates, and may be converted to the corresponding tetracyclines by microbiological reduction or by catalytic hydrogenation, as described, for example, in the Journal of the American Chemical Society, volume 80, pp. 5572 ff. and 6460 ff. (1958), and in U.S. Patents 2,965,546 and 3,005,023. As previously noted, catalytic hydrogenolysis of the hydroperoxide to the dehydrotetracyclines may be continued, if desired, until the tetracycline is formed, without the necessity for isolation of the dehydro compound. Continued reaction may lead to further hydrogenolysis, e.g. removal of a 7-halo substituent, particularly when palladium is employed as catalyst. By these procedures the dehydrotetracyclines yield known tetracycline antibiotics having therapeutic value or other biological activity, as well as new tetracyclines which possess valuable antimicrobial activity by virtue of their structural similarity to the known tetracyclines. In addition, some of the dehydrotetracyclines themselves exhibit useful antimicrobial activity.

The following examples are provided merely for illustrative purposes, and should not be interpreted as limiting the invention, many variations of which are possible within the spirit and scope thereof.

*Example 1*

A solution of 150 mg. 7-chloro-5a,6-anhydrotetracycline in 150 ml. benzene is placed in the jacket of a double-walled Pyrex cylinder, and a 100 watt mercury arc lamp is mounted in the center of the cylinder. Air is bubbled through the solution at a rate of about 300 ml. per minute while irradiating for 6 days. At the conclusion, the solution is evaporated and the residue, which contains 7-chloro - 6 - deoxy-6-hydroperoxy dehydrotetracycline, is dissolved in methanol and treated with hydrogen gas at one atmosphere in the presence of palladium for one hour. The solution is filtered and the filtrate is subjected to paper chromatography. A bioactive tetracycline spot is found, demonstrating that under the hydrogenation conditions employed the 5,5a-unsaturation as well as the 7-chloro group of the first produced 7-chloro dehydrotetracyline were also reduced.

*Example 2*

One gram of 7-chloro-5a,6-anhydrotetracycline is dissolved in 700 ml. benzene and irradiated at 25° C. in a Pyrex glass vessel with light from a fluorescent lamp for 6 days. During this period oxygen is bubbled through the solution at the rate of 200 ml. per minute.

By the end of the reaction period 0.7 gram of yellow crystalline 7-chloro-6-deoxy-6-hydroperoxy-5,5a-dehydrotetracycline has deposited on the walls. This is separated from another minor product by crystallization from chloroform.

The major product gives a positive ferrous thiocyanate reaction and has $[\alpha]_D = -20°$. Elemental analysis is as follows.

Calculated for $C_{22}H_{21}N_2ClO_9$: C, 53.64%; H, 4.30; N, 5.69. Found: C, 53.38%; H, 4.11; N, 5.68.

Infrared absorption maxima are found at 3608, 3467, 1707, 1640, 1600 and 1573 cm.$^{-1}$. Ultraviolet absorption maxima in methanolic HCl appear at 249 m$\mu$ ($\epsilon$ 24,100) and 375–380 m$\mu$ ($\epsilon$ 4,510). In methanolic nickel (++) chloride an absorption maximum is observed at 410–415 m$\mu$ ($\epsilon$ 17,600).

0.1 gram of the 7-chloro-6-deoxy-6-hydroperoxy-5,5a-dehydrotetracycline is dissolved in 10 ml. methanol and the solution is shaken with 0.02 gram 10% palladium on charcoal under one atmosphere hydrogen pressure until one molar proportion of hydrogen has been absorbed. The hydrogen is then removed under vacuum and, after filtration, the solvent is evaporated under vacuum to obtain a quantitative yield of 7-chloro-5,5a-dehydrotetracycline in the form of a yellow crystalline compound. The infrared and ultraviolet spectra are found to be identical with known 7-chloro-dehydrotetracycline. $[\alpha]_d$ in chloroform = +210°.

The product is reduced to chlorotetracycline microbiologically, and to tetracycline by catalytic hydrogenation, employing the procedures described in the literature.

*Example 3*

0.1 gram of the 7-chloro-6-deoxy-6-hydroperoxy-5,5a-dehydrotetracycline of Example 2 is dissolved in 10 ml. methanol and the solution is shaken with 0.1 gram 10% palladium on charcoal. Yellow crystalline 7-chloro-5,5a-dehydrotetracycline is obtained in quantitative yield by the recovery procedure of Example 2.

*Example 4*

0.1 gram of the 7-chloro-6-deoxy-6-hydroperoxy-5,5a-dehydrotetracycline of Example 2 is shaken with 10 ml. chloroform and 20 ml. of a solution of 10 grams of sodium sulfite in 100 ml. water. The chloroform layer is separated and evaporated to obtain 7-chloro-5,5a-dehydrotetracycline as residue. The product gives a negative ferrocyanate test for hydroperoxides.

*Example 5*

A 0.1% w./v. solution of anhydrotetracycline in toluene is exposed to light of 300–450 m$\mu$ wavelength at room temperature while oxygen is introduced beneath the surface at a rate of 0.25 volume per unit volume solution per minute. When paper chromatography of a sample demonstrates substantial disappearance of the starting compound the reaction mixture is evaporated and 6-deoxy-6-hydroperoxy-dehydrotetracycline recovered in good yield.

A 1% w./v. solution of this intermediate in chloroform is shaken with 2 volumes of 10% w./v. sodium hydrosulfite, and the chloroform phase is evaporated to recover dehydrotetracycline. Substitution of potassium sulfite or potassium hydrosulfite for sodium hydrosulfite gives the same result. The product is reduced to tetracycline by catalytic hydrogenation with palladium.

In the same manner, epitetracycline is obtained starting with anhydro-4-epitetracycline and preparing the corresponding intermediates.

Example 6

Following the procedure of the previous examples, anhydrooxytetracycline is oxidized to 6-deoxy-6-hydroperoxy-dehydrooxytetracycline in good yield. This intermediate is converted to dehydrooxytetracycline by hydrogenation in ethanol solution in the presence of rhodium catalyst until one molar proportion of hydrogen has been consumed. When the reduction is permitted to proceed further, oxytetracycline is formed, and recovered by filtering and evaporating at reduced pressure.

Example 7

Following the procedures of the earlier examples, the following hydroperoxides are prepared from the corresponding anhydrotetracyclines, and are converted in turn to the corresponding dehydrotetracyclines, and finally to the corresponding tetracyclines.

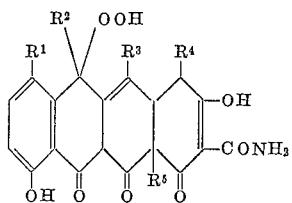

| $R^1$ | $R^2$ | $R^3$ | $R^4$ | $R^5$ |
|---|---|---|---|---|
| Bromo | Methyl | H | Dimethylamino | Hydroxy. |
| H | do | Hydroxy | H | Do. |
| Chloro | H | H | H | H. |
| H | Methyl | Hydroxy | H | H. |
| Chloro | do | H | H | Hydroxy. |
| H | do | H | H | Do. |
| H | H | H | Dimethylamino | H. |
| Chloro | H | H | do | H. |
| H | Methyl | H | do | H. |

What is claimed is:

1. A process for the transformation of an anhydrotetracycline to the corresponding dehydrotetracycline which comprises introducing molecular oxygen into a solution of said anhydrotetracycline in a reaction-inert solvent while irradiating said solution with light of wavelength between about 300 and 450 mμ, continuing said introduction and said irradiation until the anhydrotetracycline is oxidized to the corresponding 6-deoxy-6-hydroperoxy dehydrotetracycline, and reducing said hydroperoxy compound to the corresponding dehydrotetracycline.

2. A process as in claim 1 wherein said oxygen is introduced in the form of air.

3. A process as in claim 1 wherein said reduction is chemical reduction.

4. A process as in claim 3 wherein said reduction is effected by contacting said hydroperoxy compound with an aqueous solution of a reducing agent selected from the group consisting of alkali metal sulfites and alkali metal hydrosulfites.

5. A process as in claim 4 wherein said agent is sodium sulfite.

6. A process as in claim 4 wherein said agent is sodium hydrosulfite.

7. A process as in claim 1 wherein said reduction is hydrogenation in the presence of a noble metal catalyst.

8. A process as in claim 7 wherein said catalyst is palladium.

9. A process as in claim 7 wherein said catalyst is rhodium.

10. A process as in claim 7 wherein said hydrogenation is continued until said dehydrotetracycline is reduced to the corresponding tetracycline compound.

11. A compound of the formula:

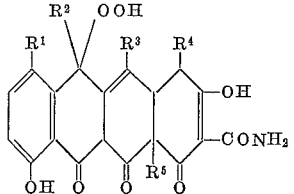

wherein
$R^1$ is selected from the group consisting of hydrogen, chloro and bromo;
$R^2$ is selected from the group consisting of hydrogen and methyl;
$R^3$ is selected from the group consisting of hydrogen and hydroxy, provided that $R^1$ is hydrogen when $R^3$ is hydroxy;
$R^4$ is selected from the group consisting of hydrogen and dimethylamino;
and $R^5$ is selected from the group consisting of hydrogen and hydroxy.

12. 7-chloro-6-deoxy-6-hydroperoxy - 5,5a - dehydrotetracycline.

13. 6-deoxy-6-hydroperoxy-5,5a-dehydrotetracycline.

14. 5-hydroxy - 6 - deoxy-6-hydroperoxy-5,5a-dehydrotetracycline.

15. The process for the transformation of an anhydrotetracycline to the corresponding 6-deoxy-6-hydroperoxy dehydrotetracycline which comprises introducing molecular oxygen into a solution of said anhydrotetracycline in a reaction-inert solvent while irradiating said solution with light of wavelength between about 300 and 450 mμ and continuing said introduction and said irradiation until anhydrotetracycline is oxidized to the corresponding 6-deoxy-6-hydroperoxy dehydrotetracycline.

References Cited in the file of this patent

Bergmann: The Chemistry of Acetylene and Related Compounds, page 80 (1948).

Scott et al.: J. Am. Chem. Soc., vol. 84, pp. 2271–2272 (1962).

McCormick et al.: J. Am. Chem. Soc., vol. 80, pp. 5573–5574 (1958).

UNITED STATES PATENT OFFICE
CERTIFICATE OF CORRECTION

Patent No. 3,146,265                                              August 25, 1964

Alastair I. Scott et al.

It is hereby certified that error appears in the above numbered patent requiring correction and that the said Letters Patent should read as corrected below.

Column 2, line 25, strike out "and dimethylamino, and" and insert instead -- ; $R^4$ is selected from --; column 3, line 18, strike out "designated. Nevertheless, there is no doubt as to the" and insert instead -- referred to in the literature as 5a, 11a-dehydrotetra- --.

Signed and sealed this 22nd day of December 1964.

(SEAL)
Attest:

ERNEST W. SWIDER                                        EDWARD J. BRENNER
Attesting Officer                                            Commissioner of Patents